2,846,413
Patented Aug. 5, 1958

2,846,413
PHENOLIC METHYLOL-PHOSPHORUS POLYMERS

Wilson A. Reeves and John D. Guthrie, New Orleans, La., assignors to the United States of America as represented by the Secretary of Agriculture No Drawing. Application April 5, 1954
Serial No. 421,212

12 Claims. (Cl. 260—47)

(Granted under Title 35, U. S. Code (1952), sec. 266)

A non-exclusive irrevocable, royalty-free license in the invention herein described, throughout the world for all purposes of the United States Government, with the power to grant sublicenses for such purposes, is hereby granted to the Government of the United States of America.

This invention relates to condensation polymers ranging in physical properties from viscous liquids which are soluble in hydrocarbon solvents or water to infusible solids which are substantially insoluble in all organic solvents and in water. More particularly the invention provides novel phosphorus-containing condensation polymers of phenolic compounds. This application is a continuation-in-part of our co-pending application, Serial No. 348,137, filed April 10, 1953, now abandoned.

The condensation polymers provided by this invention are essentially materials represented by formulas of the group:

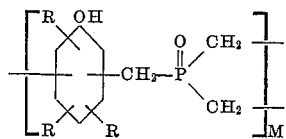

and

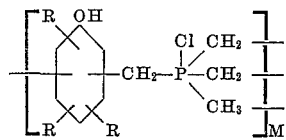

where R is a member of the group H, OH, halogen, hydrocarbon radicals, and radicals of the formula

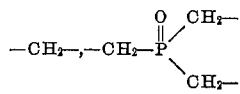

and

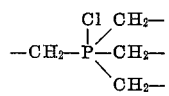

and M is an integer of at least two.

In general, these condensation polymers are produced by condensing, with the elimination of water, at least one phenolic compound and at least one polyhydric phosphorus compound of the group consisting of tetrakis-(hydroxymethyl)phosphonium chloride, tris (hydroxymethyl) phosphine oxide, and phosphorus linked methylol group containing derivatives thereof.

Hereinafter the compounds tetrakis(hydroxymethyl) phosphonium chloride and tris(hydroxymethyl) phosphine oxide are referred to by their initials THPC and THPO, respectively, and the term "phosphorus compounds" is used exclusively to refer to at least one compound of the group consisting of THPC, THPO and phosphorus linked methylol group containing derivatives thereof. The phosphorus linked methylol groups containing derivatives are the products of reacting THPC, THPO, or a mixture thereof, with at least one other compound, to form a product containing at least one $PCH_2OH$ group in which the phosphorus atoms are members of pentavalent phosphorus radicals of the group, trimethylene phosphine oxide, $(CH_2)_3PO$, and tetramethylene phosphonium chloride, $(CH_2)_4PCl$.

Illustrative examples of suitable phosphorus compounds include THPC, THPO, mixtures thereof, and phosphorus linked methylol group containing derivatives thereof. Examples of the latter include the products of reacting THPC, THPO, or a mixture thereof (to form a product containing at least one $PCH_2OH$ group in which the phosphorus atoms are members of pentavalent phosphorus radicals of the group trimethylene phosphine oxide and tetramethylene phosphonium chloride) with at least one nitrogen compound in which at least one radical of the group, hydrogen and $CH_2OH$, is attached to a trivalent nitrogen atom. Such nitrogen compounds include melamine, methylolmelamine, acrylamide, diacetamide, lysine, diethanolamine, cetylamine, ethylenimine, ammonia, hydrazine, and the like. Other phosphorus-linked methylol group containing derivatives includes reaction products of THPC, THPO, or a mixture thereof with an organic esterifying agent, such as acetic anhydride, oleoyl chloride, stearic acid, phthalic anhydride, pinic acid, chlorendic acid anhydride, sebacic acid, and the like.

Any phenolic compound capable of reacting with formaldehyde to form phenolic aldehyde resins can be used. Examples of suitable phenolic compounds include phenols and naphthols and halo- and/or hydrocarbon-substituted phenols and naphthols such as, phenol, vinylphenol, resorcinol, catechol, hydroquinone, phloroglucinol, para-tertiary-amylphenol, allylphenol, ortho-bromophenol, bromohydroquinone, 2,4-dibromo-1-naphthol, and the like.

The reaction need not be conducted in the presence of solvents or catalysts, although, either or both can be used. The phosphorus compounds and the phenolic compounds can be reacted in substantially any proportions.

Solvents which can be used, where desired, comprise liquids which are substantially miscible with and inert toward the reactants. Examples of suitable solvents include water, substantially water soluble aliphatic alcohols, glycols, acetone, dioxane and the like. Preferred solvents comprise water and aliphatic alcohols which are completely miscible with water.

Catalysts which can be used, where desired, comprise substances which are catalysts for the condensation polymerization of phenolic compounds with aldehydes to form phenolic aldehyde resins. Examples of suitable catalysts include ammonium hydroxide, alkali metal hydroxides, acetates, alcoholates and the like, urea, guanidine carbonate, aminophenols, compounds of hexamethylenetetramine, acids such as hydrochloric, sulfuric, tartaric, and the like, acyl halides such as acetyl chloride, benzoyl chloride and the like, and chloride of iron, zinc and the like.

Preferred phenolic compounds are hydroxybenzenes of the group consisting of phenol and halo, hydroxyl and alkyl-substituted phenols in which hydrogen atoms are attached to at least two ring carbon atoms which are ortho or para to a hydroxyl group.

Preferred phosphorus compounds are THPC and mixtures of THPC and THPO predominating in THPC. Such mixtures can be prepared by mixing the individual compounds or by reacting THPC with a basic compound until a minor proportion is converted to THPO. Illustrative examples of basic compounds with which THPC can be reacted to produce a mixture of THPC and THPO include: primary and secondary amines, such as cetyl amine, diethanol amine, and the like, which also react with the phosphorus linked methylol groups to concurrently form modified phosphorus compounds; tertiary amines such as triethanolamine; and inorganic bases, such as water soluble salts of carbonic acid, and the like.

The use of mixtures of THPO and THPC produced by reacting THPC with the basic compounds are particularly advantageous in that the basic compound contained in the mixture can serve as a catalyst for the condensation of the mixed phosphorus compounds with the phenolic compound.

Where the phosphorus compound used is THPO or a mixture of THPC and THPO predominating in THPO, or where the condensation reaction is catalyzed with a basic compound, the resulting phenolic polymers have the formula of the first type illustrated, in which the reoccurring units contain trimethylene phosphine oxide groups. Alternately, where the phosphorus compound used is THPC and the condensation reaction is conducted in a substantially neutral or acidic medium, the resulting phenolic polymers have the formula of the second type illustrated as well as the first type in which the reoccurring structural units contain tetramethylene phosphonium chloride and trimethylene phosphine oxide groups.

Where either or both the phosphorus compound and the phenolic compound contain olefinic unsaturation (e. g. where the phosphorus compound is the methylol group containing phosphorus compound derivative produced by reacting THPC with acrylamide, and/or, the phenolic compound is vinylphenol) the polymers produced retain the unsaturation and are capable of undergoing the olefinic compound addition reactions such as halogenation, alkylation and free radical induced vinyl-type polymerization.

The condensation polymerization reaction between the phosphorus compound and the phenolic compound can be conducted at temperatures ranging from about 70° C. to 170° C. Preferred reaction temperatures comprise temperatures ranging from about 100 to 150° C.

The condensation polymerization passes through somewhat distinct stages. The stages are very comparable to the stages commonly referred to as A, B, and C, in the case of the condensation polymerization of phenolic compounds with aldehydes.

The phenolic compound-tetrakis(hydroxymethyl) phosphonium chloride polymers in stage A are relatively viscous liquids having a relatively high degree of miscibility with varnish solvents. Such polymers in stage B are generally relatively solid gels having a markedly lower degree of miscibility with varnish solvents. Such polymers in stage C are infusible, insoluble resins.

The process of the present invention can be employed in conjunction with processes of condensing a phenolic compound with an aldehyde to form a phenolic aldehyde resin. For example, by replacing a minor amount of tetrakis(hydroxymethyl)phosphonium chloride with an aldehyde, the polymers provided by the present invention are modified chemically and physically so that they more closely resemble the corresponding phenolic aldehyde resin, and by replacing a minor amount of the aldehyde used in the production of a phenolic aldehyde resin with tetrakis(hydroxymethyl)phosphonium chloride the polymers produced are modified to more closely resemble the novel polymers provided by the present invention.

The physical properties of the polymers provided by this invention can be modified by the use of modifiers suitable for use in phenolic aldehyde resins. The changes in physical properties brought about by the incorporation of such modifiers are of a nature and extent similar to the changes in physical properties caused by incorporating the modifiers in a phenolic aldehyde resin.

The polymers provided by this invention are resistant to burning and are particularly valuable for use as ingredients of varnishes, surface coatings, and molded articles in which a high resistance to heat and/or burning is desired.

The following examples are illustrative of the invention:

EXAMPLE 1

THPO and phenol

Three parts of THPO and 3 parts of phenol were mixed together in a beaker and heated upon a hot plate. A molten mixture formed within a few minutes. The molten mixture was a clear viscous liquid which was soluble in water and in ethanol. When the viscous liquid was heated on hot plate for about 10 minutes, a clear jell formed. This jell was insoluble in water and ethanol. When a portion of the jell was heated for another short period on the hot plate, it turned dark colored and became brittle.

EXAMPLE 2

THPO and resorcinol

One part of THPO and one part of resorcinol were heated together in 3 parts of water. A clear solution formed. When a portion of the solution was heated in a beaker, a jell formed. When the clear solution was spread out into a thin layer and heated at 120° C., a clear hard polymer formed. The polymer was insoluble in water, methanol, ethanol, and in toluene. When it was boiled in alkaline water, it was insoluble but turned a red-brown color.

EXAMPLE 3

THPC and ortho-bromophenol

A mixture of 3.8 grams of ortho-bromophenol and 4.0 grams of THPC was heated and stirred. When the mixture began to boil, a clear solution resulted.

Seven minutes of boiling produced a material which was insoluble in water and in toluene and was a viscous liquid at 165° C.

After two more minutes of heating the liquid polymer jelled. The jell, while hot, acted like gum rubber, but when cooled it became hard. The jell was amber colored and was insoluble in water and in toluene.

When the jell was heated for several minutes on a hot plate, it became rigid and dark colored and remained insoluble in water and in toluene.

When 3.6 grams of ortho-bromophenol was heated and stirred with 2.0 grams of THPC, a viscous liquid was formed, as above; but after a total of 5 minutes of heating, a rapid reaction occurred and white fumes were expelled. Thirty seconds after the rapid reaction started, a hard black and brittle resin was produced. The resin was insoluble in water and in toluene.

EXAMPLE 4

THPC and bromohydroquinone

A solution of 3.5 grams of bromohydroquinone in 12 ml. of 50% ethanol was mixed with 4 grams of THPC and heated. The mixture soon became a clear solution. The solution was heated in an open vessel, so that water and ethanol distilled off, and a viscous liquid was produced. A rapid reaction started in the viscous liquid and within 30 seconds a hard, black resin was produced. The resin was insoluble in water and in toluene.

EXAMPLE 5

THPC and 2,4-dibromo-1-naphthol

A solution of 3.0 grams of the naphthol derivative was dissolved in 15 ml. of 95% ethanol and mixed with 2.0 grams of THPC. The mixture was heated to distill off the $H_2O$ and ethanol. During this distillation a two phase liquid system was formed. Heating was continued and, about the time a single phase system was formed, a rapid reaction started. In about 30 seconds a hard purple colored resin was formed. The resin was insoluble in water, ethanol and toluene.

EXAMPLE 6

The following experiments illustrate the ease of polymerization of THPC with various phenolic compounds.

In experiments A through F mixtures of the indicated reactants were first heated (70° C.) at constant volume for 5 hours, generally producing a clear solution, then cooled to room temperature, and then treated as described in detail.

| Exp. # | The phenol used | Moles of phenol | Moles of THPC | Solvent | Percent P in resin | Percent Cl in resin |
|---|---|---|---|---|---|---|
| A | phloroglucinol | 0.02 | 0.02 | H₂O (20 ml.) | 6.01 | 5.95 |
| B | phenol | 0.02 | 0.02 | H₂O (20 ml.) | 1.46 | 1.01 |
| C | resorcinol | 0.02 | 0.02 | H₂O (20 ml.) | 4.29 | 5.54 |
| D | catechol | 0.02 | 0.02 | H₂O (20 ml.) | 1.99 | 1.33 |
| E | hydroquinone | 0.02 | 0.02 | H₂O (20 ml.) | 2.51 | 0.15 |
| F | phloroglucinol | 0.02 | 0.02 | Ethanol 95% 20 ml. | 9.26 | 5.77 |
| G | P-tert-amyl phenol | 0.02 | 0.02 | 20 ml. of 75% ethanol. | | |
| H | ----do---- | 0.02 | 0.02 | 15 ml. of abs. ethanol. | 0.75 | |
| K | ----do---- | 0.02 | 0.01 | 5 ml. of abs. ethanol. | 0.88 | |

Experiment details:

(A) After 10 min. of boiling in open beaker all of the phloroglucinol was in solution. After 26 min. a thick syrup was removed and cooled. A clear water soluble and ethanol soluble, flexible straw colored polymer resulted. When this was heated a few more minutes at 110° C. a red-brown, water and ethanol insoluble polymer resulted.

(B) After 25 min. of boiling in open beaker a pink granular polymer was deposited. The polymer was insoluble in water and in ethanol. The polymer became dark colored but did not melt or soften at 300° C.

(C) After the steam bath treatment, this sample became a hard, flexible, slightly yellow polymer which was soluble in water and in ethanol. When this intermediate polymer was heated 25 min. at 110° C. it became orange colored, more brittle and insoluble in water and in ethanol.

(D) When this solution was heated about 25 min. an exothermic reaction began. The reaction expelled white vapors and lasted about one minute. After the reaction the clear solution was a dark colored (intense green) polymer. The polymer was hard and brittle and insoluble in water and ethanol.

(E) Solution E was treated in the manner described for D and produced a similar polymer.

(F) After heating 23 min., a thick straw colored, water and ethanol soluble syrup was produced. A tan colored polymer was produced by heating the syrup for a few minutes at 110° C. The polymer was water and ethanol insoluble.

(G) THPC and p-tert-amyl phenol were placed in 20 mls. of 75% ethanol and boiled vigorously in an open beaker. The phenol did not all dissolve immediately, a two phase liquid resulted. When nearly all of the lower phase disappeared and the phases began to become viscous, as indicated by the rate at which the bubbles rose through the boiling solution, a rapid exothermic reaction began. The beaker was removed from the hot plate and white fumes were expelled for about 30 seconds. A pale yellow solid polymer resulted. It was slightly soluble in acetone or in petroleum naphtha having a boiling point between about 300-400° F., such as the naphtha marketed under the name Varsol, and more soluble in xylene and toluene. This polymer had a softening point at 133–140° C. which remained the same after it was melted and cooled three times.

(H) THPC and p-tert-amyl phenol were dissolved in 15 ml. of absolute ethanol then heated to boil. Two phases soon appeared, but, with more heating, the lower phase disappeared and the upper phase increased in volume. Just as a single phase solution formed, the solution was cooled rapidly. The solution solidified to a clear polymer which was soluble in acetone, ethanol and toluene. The polymer had a softening point of 50–60° C. When this polymer was boiled until it became very viscous (would barely flow off the end of a stirring rod) at 115–120° C., it was cooled. The softening point was now greater (80–93° C.) but the polymer was still soluble in acetone and in toluene. When a toluene solution of this polymer was allowed to evaporate at room temperature it formed a clear hard film which easily peeled off of glass.

(K) P-tert-amyl phenol (0.02 mole) and THPC (0.01 mole) were dissolved in 5 ml. of absolute ethanol. The solution was boiled and, within a few minutes, a two phase mixture formed. The lower phase was small and disappeared after a brief boiling. A very viscous solution resulted within another few minutes of boiling at 110°–120° C. When this solution was cooled only slightly, a hard, clear, water insoluble resin was produced. This resin was soluble in acetone or in toluene, and had a softening point at 85–95° C. A toluene solution of this resin formed a hard clear film when allowed to dry at room temperature for 1–2 hours.

(L) P-tert-amyl phenol (3.3 gm., .02 mole) and THPC (2.2 gr.; 0.011 mole) were stirred together (no solvent) and heated upon hot plate. The mixture softened at about 90° C. (M. P. of P-tert-amylphenol=92° C.) and a clear two phase solution formed at about 115° C. The solution was heated and its temperature gradually rose to 150° C. After 17 min. of heating from the time a clear solution formed a sample, L–1, was removed. Samples were removed at 20, 23, and 29 minutes when the temperature was at 160° C.; these samples are designated L–2 through L–4. Sample L–5 was taken at 33 min. and the remainder of sample jelled at 37 min.

| Sample # | Time of heating, min. | Softening pt., ° C. | Solubility |
|---|---|---|---|
| L–1 | 17 | 70– 75 | Very soluble in toluene. |
| L–2 | 20 | 75– 80 | Do. |
| L–3 | 23 | 80– 85 | Do. |
| L–4 | 29 | 115–120 | Do. |
| L–5 | 33 | 130–137 | Do. |
| L–6 | 37 | 140–145 | Swells in toluene, slight solubility. |
| L–7 | 62 | 180–185 | Insoluble in toluene. |

It might be pointed out that polymers L–1 through L–5 are useful in surface coatings either in lacquers or varnishes. Polymers L–6 and L–7 which are insoluble and had higher softening points are of special value in preparing flameproofed molded products.

EXAMPLE 7

THPC, formaldehyde and phenol

Two parts of THPC, two parts of 40% aqueous formaldehyde and 3 parts of phenol were mixed together and heated on a steam bath with stirring for 30 minutes after which the viscous solution was placed upon a hot plate and heated. Within a few minutes a clear jell formed. The jell was heated 10–15 minutes longer on the hot plate at low heat and it became hard, brittle, light brown in color and insoluble in water and common organic solvents.

EXAMPLE 8

*Derivative of THPC and resorcinol and derivative of THPC and urea*

Two parts of resorcinol and two parts of THPC in two parts of water were heated together until a clear viscous liquid resulted. To this was added the H₂O soluble reaction product formed by heating at the boil 2 parts of THPC with two parts of urea in 2 parts of water for 20 minutes. The entire contents were mixed well then placed upon a hot plate and heated at medium heat. The mass jelled within about 10 minutes, and upon further heating a hard clear polymer formed which contained phosphorus and nitrogen.

EXAMPLE 9

THPC, THPO and resorcinol

One part of THPO, two parts of THPC and 4 parts of resorcinol were mixed in 3 parts of water and then 0.3 part of triethanolamine were added. The solution was stirred and heated on a hot plate. Within about 10 to 15 minutes a jell had formed. A hard, insoluble and non-flammable resin formed when the jell was heated for about an additional 10 minutes.

EXAMPLE 10

NH₄-insolubilization of polymer of THPC and phenol

One part of phenol and 4 parts of THPC in 5 parts of water were heated to boil until much of the water had boiled out and then 0.1 part of 35% NH₄OH was added. The solution was heated for about 10 minutes on a hot plate when jellation occurred.

We claim:

1. A flame proof condensation polymer produced by heating at a temperature of about from 70° to 170° C. a composition comprising a phenol and at least one polyhydric phosphorus compound selected from the group consisting of tetrakis (hydroxymethyl) phosphonium chloride, tris (hydroxymethyl) phosphine oxide, and phosphorus-linked methylol-group-containing derivatives thereof obtained by heating a member of the group consisting of tetrakis (hydroxymethyl) phosphonium chloride, tris (hydroxymethyl) phosphine oxide, and mixtures thereof with at least one compound selected from the group consisting of ammonia, hydrazine, lysine, hydrocarbon- substituted primary and secondary amines and amides, and methylol- substituted amines, the mole ratio of polyhydric phosphorus compound to phenol in the composition being about from 1:1 to 1:3, respectively.

2. The polymer of claim 1 in which the polyhydric phosphorus compound is reacted with phenol.

3. A flame proof condensation polymer produced by heating at a temperature of about from 70° to 170° C. a composition comprising a phenol, formaldehyde, and at least one polyhydric phosphorus compound selected from the group consisting of tetrakis (hydroxymethyl) phosphonium chloride, tris (hydroxymethyl) phosphine oxide, and phosphorus-linked methylol-group-containing derivatives thereof obtained by heating a member of the group consisting of tetrakis (hydroxymethyl) phosphonium chloride, tris (hydroxymethyl) phosphine oxide, and mixtures thereof with at least one compound selected from the group consisting of ammonia, hydrazine, lysine, hydrocarbon- substituted primary and secondary amines and amides, and methylol- substituted amines, and mole ratio of polyhydric phosphorus compound to phenol in the composition being about from 1:1 to 1:3, respectively.

4. The polymer of claim 3 in which the polyhydric phosphorus compound is reacted with phenol.

5. A process for producing a flame proof condensation polymer which comprises heating at a temperature of about from 70° to 170° C. a composition comprising a phenol and at least one polyhydric phosphorus compound selected from the group consisting of tetrakis (hydroxymethyl) phosphonium chloride, tris (hydroxymethyl) phosphine oxide, and phosphorus- linked methylol-group-containing derivatives thereof obtained by heating a member of the group consisting of tetrakis (hydroxymethyl) phosphonium chloride, tris (hydroxymethyl) phosphine oxide, and mixtures thereof with at least one compound selected from the group consisting of ammonia, hydrazine, lysine, hydrocarbon- substituted primary and secondary amines and amides, and methylol-substituted amines, the mole ratio of polyhydric phosphorus compound to phenol in the composition being about from 1:1 to 1:3, respectively.

6. The process of claim 5 in which the composition heated comprises tetrakis (hydroxymethyl) phosphonium chloride, resorcinol, and urea.

7. The process of claim 5 in which the phosphorus compound is tetrakis(hydroxymethyl)phosphonium chloride and the phenolic compound is para-tertiary-amyl-phenol.

8. The process of claim 5 in which the phosphorus compound is tetrakis(hydroxymethyl)phosphonium chloride and the phenolic compound is phenol.

9. The process of claim 5 in which the phosphorus compound is tris(hydroxymethyl) phosphine oxide and the phenolic compound is phenol.

10. The process of claim 5 in which the phosphorus compound is tris(hydroxymethyl) phosphine oxide and the phenolic compound is resorcinol.

11. The process of claim 3 in which the phenol is heated with a mixture of tetrakis (hydroxymethyl) phosphonium chloride and tris (hydroxymethyl) phosphine oxide predominating in tetrakis (hydroxymethyl) phosphonium chloride.

12. The process of claim 11 in which the phenol is resorcinol.

No references cited.